United States Patent
Mallick

(10) Patent No.: US 8,626,124 B2
(45) Date of Patent: Jan. 7, 2014

(54) METHOD AND SYSTEM FOR SYNCHRONIZING ATTRIBUTES AMONG ELECTRONICS DEVICES

(75) Inventor: Prateek Basu Mallick, Bangalore (IN)

(73) Assignee: Samsung Electronics Co., Ltd., Suwon-si (KR)

(*) Notice: Subject to any disclaimer, the term of this patent is extended or adjusted under 35 U.S.C. 154(b) by 385 days.

(21) Appl. No.: 12/609,357

(22) Filed: Oct. 30, 2009

(65) Prior Publication Data

US 2010/0112947 A1 May 6, 2010

(30) Foreign Application Priority Data

Oct. 31, 2008 (IN) .................... 2664/CHE/2008PS
Oct. 29, 2009 (IN) .................... 2664/CHE/2008CS

(51) Int. Cl.
*H04M 1/66* (2006.01)
*H04W 4/00* (2009.01)

(52) U.S. Cl.
USPC ........................................ 455/411; 370/338

(58) Field of Classification Search
USPC ...................... 455/444, 448, 404.1
See application file for complete search history.

(56) References Cited

U.S. PATENT DOCUMENTS

| 2007/0268884 A1* | 11/2007 | Kolavennu et al. | 370/350 |
| 2007/0288157 A1* | 12/2007 | Peterman | 701/207 |
| 2008/0101400 A1* | 5/2008 | Auterinen | 370/463 |
| 2009/0138360 A1* | 5/2009 | Choti et al. | 705/14 |

FOREIGN PATENT DOCUMENTS

| JP | 2001-100972 A | 4/2001 |
| KR | 10-2003-0047962 A | 6/2003 |
| KR | 10-2003-0091287 A | 12/2003 |
| KR | 10-2007-0088878 A | 8/2007 |

* cited by examiner

*Primary Examiner* — Michael Faragalla
(74) *Attorney, Agent, or Firm* — Jefferson IP Law, LLP

(57) ABSTRACT

A method and system for notifying a security context to an electronic device for inter radio access technology mobility is provided. The method includes establishing the inter radio access technology mobility for the electronic device by a core network node. The method also includes determining a security context for the electronic device based on the establishing by the core network node. Further, the method includes transmitting an indication of the security context to the electronic device based on the determination. The system includes a core network node to determine the security context for the electronic device. The system also includes a source radio access network node to transmit an indication of the security context to the electronic device and the electronic device using the security context for the inter radio access technology mobility.

14 Claims, 5 Drawing Sheets

METHOD AND SYSTEM FOR SYNCHRONIZING ATTRIBUTES AMONG ELECTRONICS DEVICES

PRIORITY

This application claims the benefit under 35 U.S.C. §119 (a) of an Indian provisional patent application filed on Oct. 31, 2008 in the Indian Patent Office and assigned Serial No. 2664/CHE/2008 (PS), and an Indian Non-provisional patent application filed on Oct. 29, 2009 in the Indian Patent Office and assigned Serial No. 2664/CHE/2008 (CS), the entire disclosure of which is hereby incorporated by reference.

BACKGROUND OF THE INVENTION

1. Field of the Invention

The present disclosure relates generally to the field of wireless communication. More particularly, the present disclosure relates to a method and system for notifying a security context to an electronic device for inter radio access technology mobility.

2. Background of the Invention:

Inter radio access technology (RAT) mobility refers to an ability to support transfer of an electronic device between different radio access networks. Wireless technologies use different security contexts during and after the inter RAT mobility from a source RAT to a target RAT. The wireless technologies use a mapped security context during the inter RAT mobility and a cached security context after the inter RAT mobility. The mapped security context can be determined using one or more security parameters of a source RAT. The cached security context is the stored security context in the electronic device and a core network. The cached security context can be available due to an earlier inter RAT mobility of the electronic device to the target RAT. The mapped security context is activated in the electronic device during the inter RAT mobility from source RAT to the target RAT and stored against a key set indicator corresponding to the source RAT. After the inter RAT mobility, if the cached security context is present then a core network node needs to identify the cached security context from the electronic device and also needs to indicate to the electronic device to replace the mapped security context with the cached security context. In some scenarios, the electronic device requires to switch the mapped security context to the cached security context. For such scenarios, the core network node indicates a source key set indicator associated with the source RAT or a target key set indicator associated with the target RAT to the electronic device. The source key set indicator indicates the mapped security context and the target key set indicator indicates the cached security context. Since a range of both the source key set indicator and the target key set indicator is similar, the electronic device fails to distinguish between the source key set indicator and the target key set indicator thereby leading to inability of the electronic device to determine the security context as indicated by the core network node.

In light of the foregoing discussion, there is a need for a method and system for notifying a security context to an electronic device for inter radio access technology mobility.

SUMMARY OF THE INVENTION

An aspect of the present invention is to address at least the above-mentioned problems and/or disadvantages and to provide at least the advantages described below. Accordingly, an aspect of the present invention is to provide a method and system for notifying a security context to an electronic device for inter radio access technology mobility.

An example of a method for notifying a security context to an electronic device for inter radio access technology mobility includes establishing the inter radio access technology mobility for the electronic device by a core network node. The method also includes determining a security context for the electronic device based on the establishing by the core network node. Further, the method includes transmitting an indication of the security context to the electronic device based on the determination.

An example system for notifying a security context to an electronic device for inter radio access technology mobility includes a core network node to determine the security context for the electronic device. The system also includes a source radio access network node to transmit an indication of the security context to the electronic device. Further, the system includes the electronic device using the security context for the inter radio access technology mobility.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinarily skill in the art will recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Exemplary embodiments of the present disclosure described herein provide a method and system for notifying a security context to an electronic device for inter radio access technology mobility. As used herein, the term inter Radio Access Technology (RAT) mobility refers to an ability to support transfer of the electronic device between different radio access networks. During inter RAT mobility the electronic device is transferred from a source radio access network node of a source RAT to a target radio access network node of a target RAT.

Figure 1:
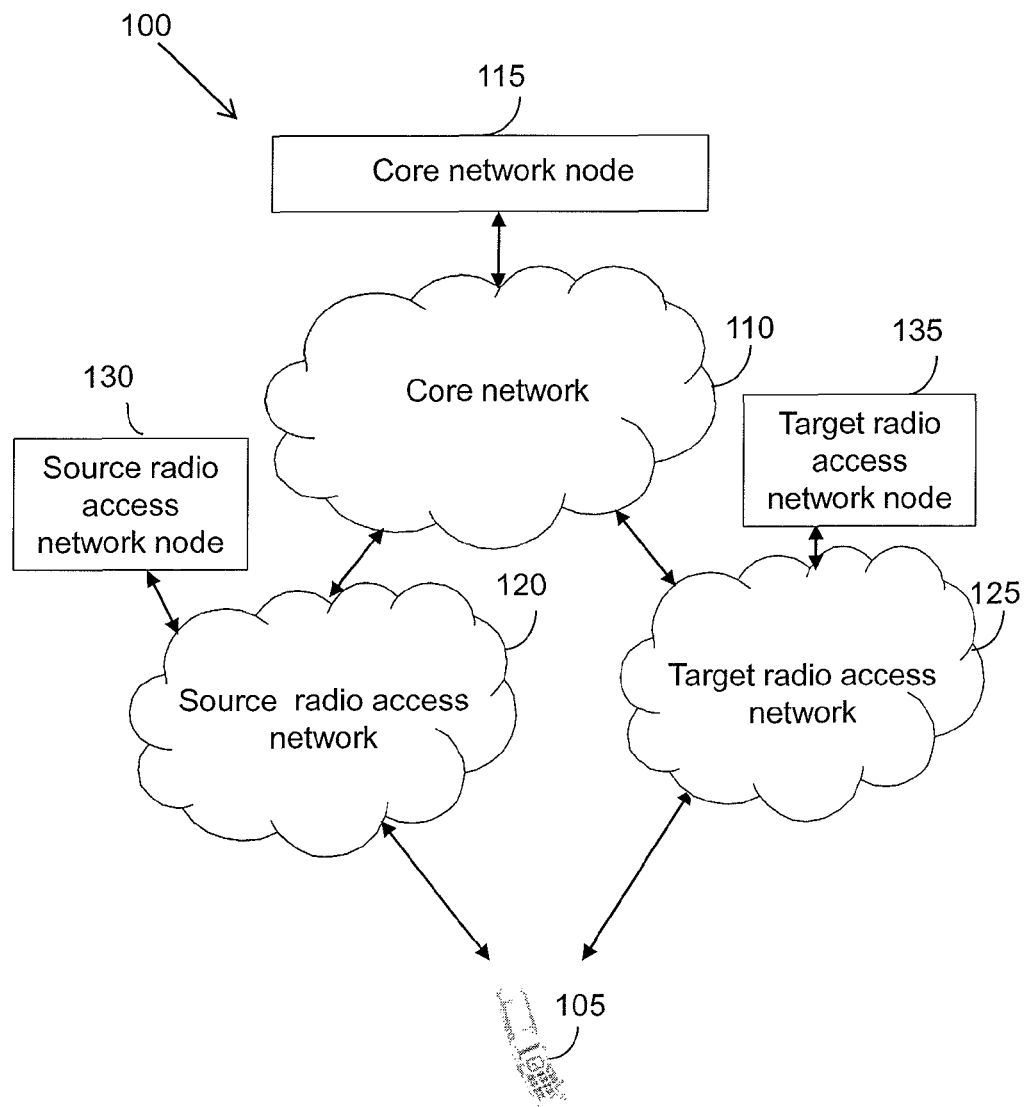
FIG. 1 is a system for notifying a security context to an electronic device for inter radio access technology mobility according to an exemplary embodiment of the present invention.

FIG. 1 illustrates a system 100 for notifying a security context to an electronic device for inter RAT mobility, in accordance with one embodiment. The system 100 includes an electronic device 105. Examples of the electronic device 105 include, but are not limited to, a cellular device, a handheld device, and a personal digital assistant.

The system 100 also includes a core network 110 that provides one or more telecommunication services to the electronic device 105. Examples of the telecommunication services include, but are not limited to, a call service and a messaging service. Examples of the core network 110 include, but are not limited to, a Global System for Mobile communications (GSM) network, a Long Term Evolution (LTE) network, and Worldwide interoperability for Microwave access (WiMax). A core network node 115 can be connected to the core network 110. The system 100 further includes one or more radio access networks, for example a source radio access network 120 and a target radio access network 120b. The inter RAT mobility of the electronic device 105 can be enabled from the source Radio Access Network 120 (RAN) to the target RAN 115b. A source RAN node 130 can be connected to the source RAN 120 and a target RAN node 135 can be connected to the target RAN 125. The source RAN 120 and the target RAN 125 implement different RATs and use different terrestrial air interface standards and frequency bands to communicate with the electronic device 105 and the core network node 115.

The source RAN 120 and the target RAN 125 mediate communication between the electronic device 105 and the core network node 115. Examples of the source RAN 120 and the target RAN 125 include, but are not limited to, an evolved RAN, an LTE RAN, a GSM Edge Radio Access Network (GERAN), a Universal mobile telecommunication system Terrestrial Radio Access Network (UTRAN), and a GSM radio access network. The electronic device 105 is connected to one of the source RAN 120 or the target RAN 125 at a given instant of time. If the electronic device 105 is connected to the source RAN 120, then the core network node 115 communicates with the electronic device 105 via the source RAN 120 in order to provide the telecommunication services to the electronic device 105. In order to use RAT services provided by the target RAN 125, the electronic device 105 can be connected to the target RAN 125 by getting disconnected from the source RAN 120. An ability of the electronic device 105 to switch between the source RAN 120 and the target RAN 125 is termed as the inter RAT mobility.

The electronic device 105 uses different security contexts during and after the inter RAT mobility. Examples of the security contexts include, but are not limited to, a mapped security context and a cached security context. The electronic device 105 acquires the mapped security context during the inter RAT mobility from the source RAN 120 to the target RAN 125. The mapped security context is determined using one or more security parameters of the source RAN 120 during the inter RAT mobility. The mapped security context is stored against a key set indicator corresponding to the source RAN 120. The cached security context corresponds to the target RAN and is present in the electronic device 105, if the electronic device 105 was previously connected to the target RAN 125. If the cached security context is present after the inter RAT mobility, then the core network node 115 identifies the cached security context from the electronic device 105 and decides either to retain the mapped security context or to change the mapped security context to the cached security context for the electronic device 105.

If the core network node 115 decides to retain the mapped security context, the core network node 115 indicates the mapped security context to the electronic device 105. If the core network node 115 decides to change the security context of the electronic device 105 to the cached security context, the core network node 115 indicates the cached security context to the electronic device 105. The core network node 115 transmits a suitable message to the source RAN 120 to intimate the indication of the security context to the electronic device 105. The source RAN node 130 then transmits the indication of the mapped security context or the cached security context to the electronic device 105 based on the message from the core network node 115.

Figure 2:
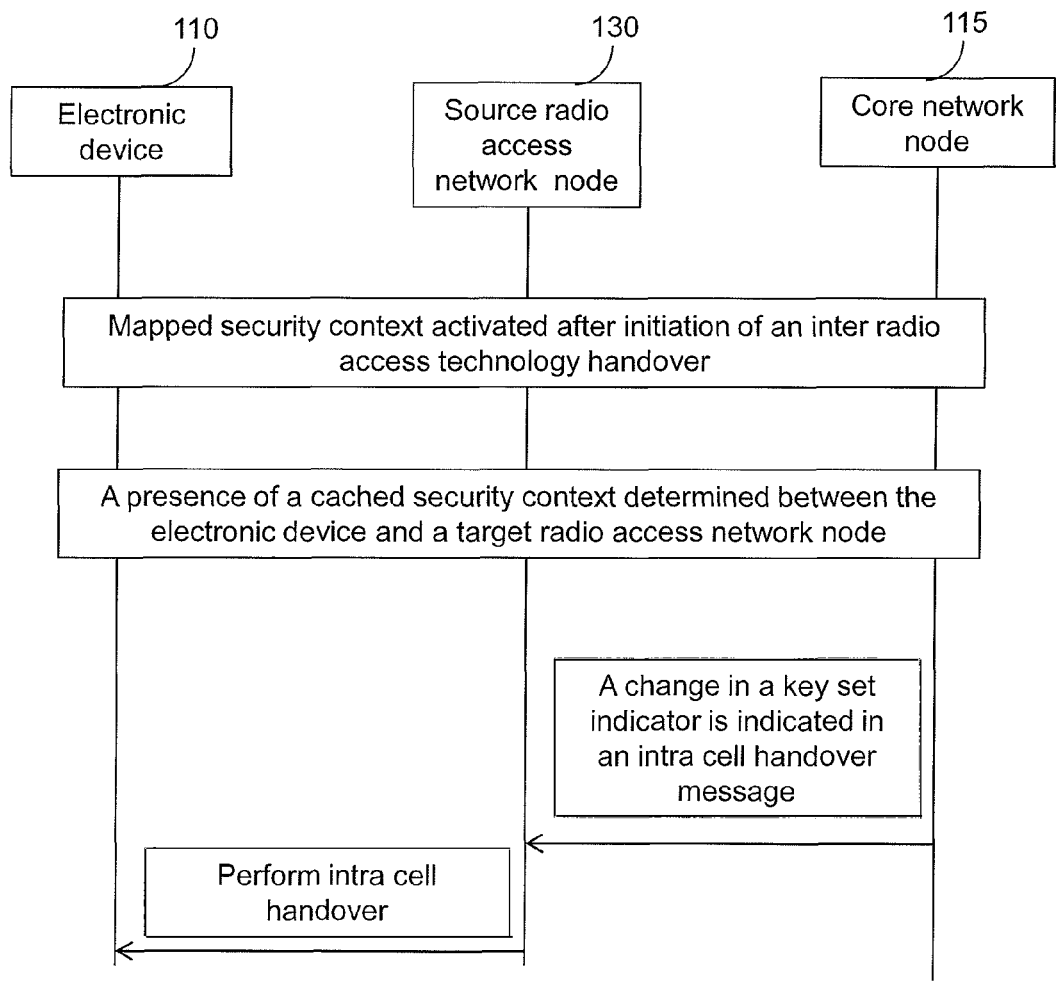
FIG. 2 is a flow diagram illustrating signaling to an electronic device for inter radio access technology mobility according to an exemplary embodiment of the present invention.

FIG. 2 is a flow diagram illustrating signaling to the electronic device 105 for the inter RAT mobility, in accordance with one embodiment. The core network node 115 establishes the inter RAT mobility from the source RAN node 130 to the target RAN node for the electronic device 105. The core network node 115 transmits a handover message to the source RAN node 130 to shift the electronic device 105 from the source RAN node 130 to the target RAN node. The source RAN node 130 transmits the handover message to the electronic device 105 thereby initiating an inter RAT handover. The electronic device 105 can shift to the target RAN node based on the handover message. The mapped security context of the target RAN is activated in the electronic device 105 after the initiation of the inter RAT handover. A presence of the cached security context is determined between the electronic device 105 and the target RAN node. The electronic device 105 then transmits an indication of the presence of the cached security context to the core network node 115. The core network node 115 determines one of the cached security context or the mapped security context for the electronic device 105 based on the indication. The core network node 115 further indicates a change in the key set indicator from a source key set indicator to a target key set indicator for the electronic device 105. A change in the key set indicator is indicated in an access stratum message, for example a handover command message and a security mode command message. The access stratum message is transmitted from the source RAN node 130 to the electronic device 105. An intra cell handover is performed. The intra cell handover changes the key set indicator of the electronic device 105 from the source key set indicator to the target key set indicator.

Figure 3:
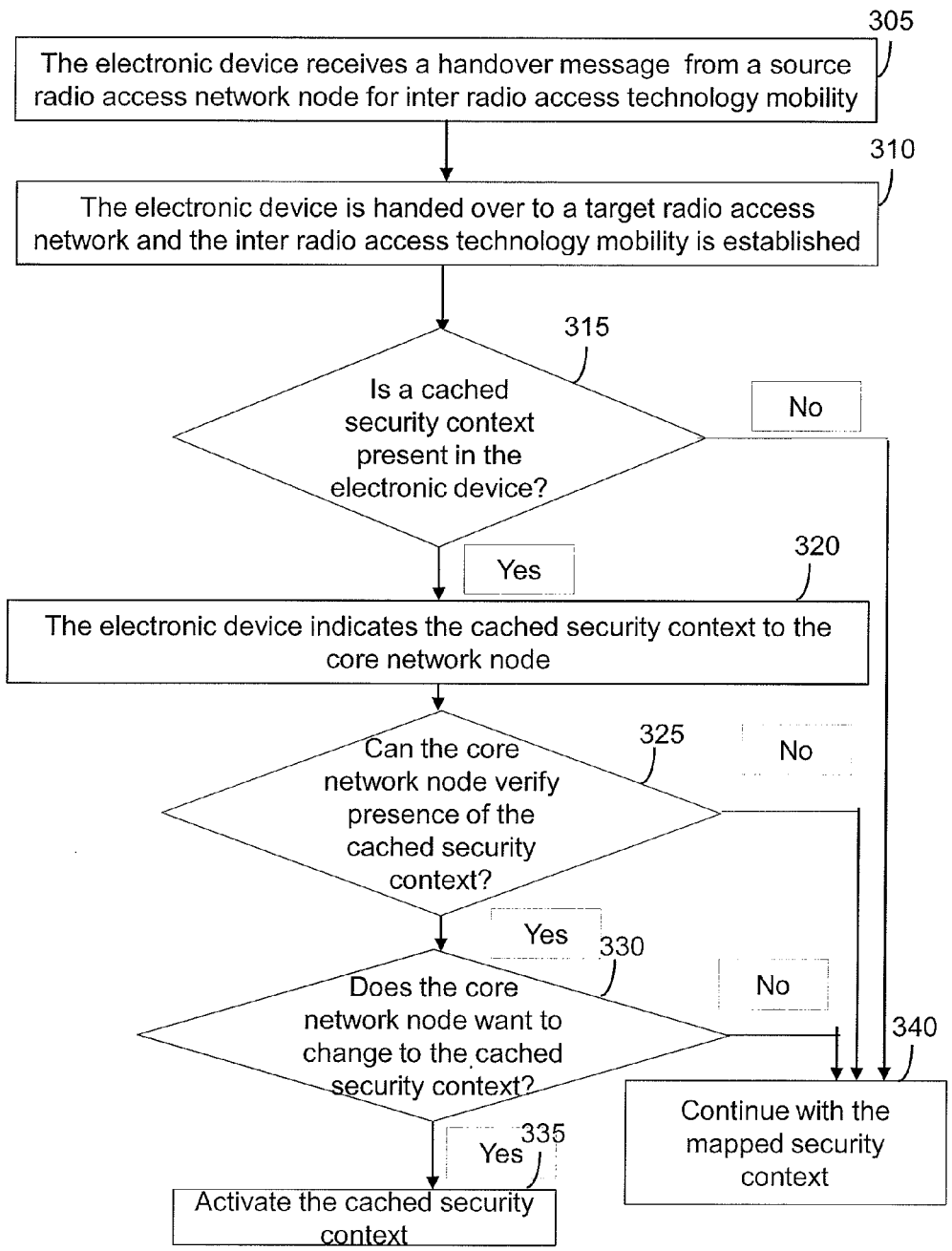
FIG. 3 is a flowchart illustrating determination of a security context for inter radio access technology mobility of an electronic device according to an exemplary embodiment of the present invention.

FIG. 3 is a flowchart illustrating determination of the security context for the inter RAT mobility of the electronic device, in accordance with one embodiment. The core network node transmits the handover message to the source RAN node for enabling the inter RAT mobility. At step 305, the electronic device receives the handover message from the source RAN node. At step 310, the electronic device is handed over to the target RAN, based on the handover message, and establishes the inter RAT mobility. The electronic device determines a presence of the cached security context, associated with the target RAN node, at step 315. If the cached security context is not present, step 340 is performed. If the cached security context is present, step 320 is performed. At step 320, the electronic device indicates the cached security context to the core network node. At step 325, the core network node verifies the presence of the cached security context based on the indication from the electronic device. If the core network node verifies the presence of the cached security context, step 330 is performed else step 340 is performed. At step 330, the core network node decides whether to change the security context of the electronic device to the cached security context or retain the mapped security context. If the core network node decides to change the security context, then step 335 is performed else step 340 is performed. The core network node activates the cached security context in the electronic device at step 335. At step 340, the electronic device continues with the mapped security context.

Figure 4:
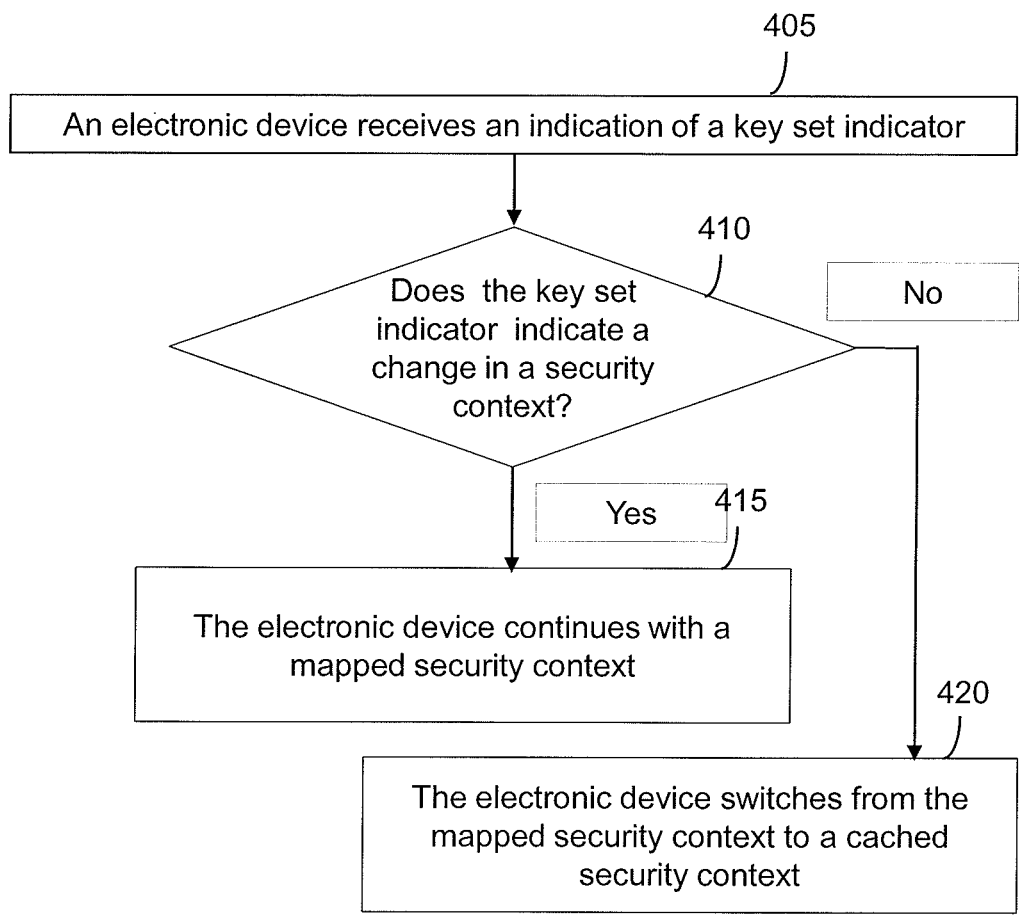
FIG. 4 is a flowchart illustrating acquisition of a security context by an electronic device for inter radio access technology mobility according to an exemplary embodiment of the present invention.

FIG. 4 is a flowchart illustrating acquisition of the security context by the electronic device for the inter RAT mobility, in accordance with another embodiment. The core network node determines the security context for the electronic device during the RAT mobility. The security context can be either the mapped security context or the cached security context. The core network node transmits the indication of the security context to the electronic device. At step 405, the electronic device receives the indication of the key set indicator. The indication can be one of a valid key set indicator, an invalid key set indicator or a bit value for a key set indicator. The bit value of the key set indicator can be either 0 representing a true logic or 1 representing a false logic. In some embodiments, the bit value of the key set indicator and the invalid key set indicator can indicate the mapped security context to the electronic device. In some embodiments, the bit value of the key set indicator and the invalid key set indicator can indicate the cached security context to the electronic device. In some embodiments, the valid key set indicator can indicate the cached security context to the electronic device. In other embodiments, the valid key set indicator can indicate the mapped security context to the electronic device. A check is performed at step 410 to determine if the key set indicator indicates a change in the security context. If the key set indicator indicates the change in the security context at step 410, step 415 is performed else step 420 is performed. At step 415, the electronic device continues with the mapped security context. If the electronic device receives the invalid key set indicator or the bit value for the key set indicator, the electronic device switches the mapped security context to the cached security context at step 420.

Figure 5:
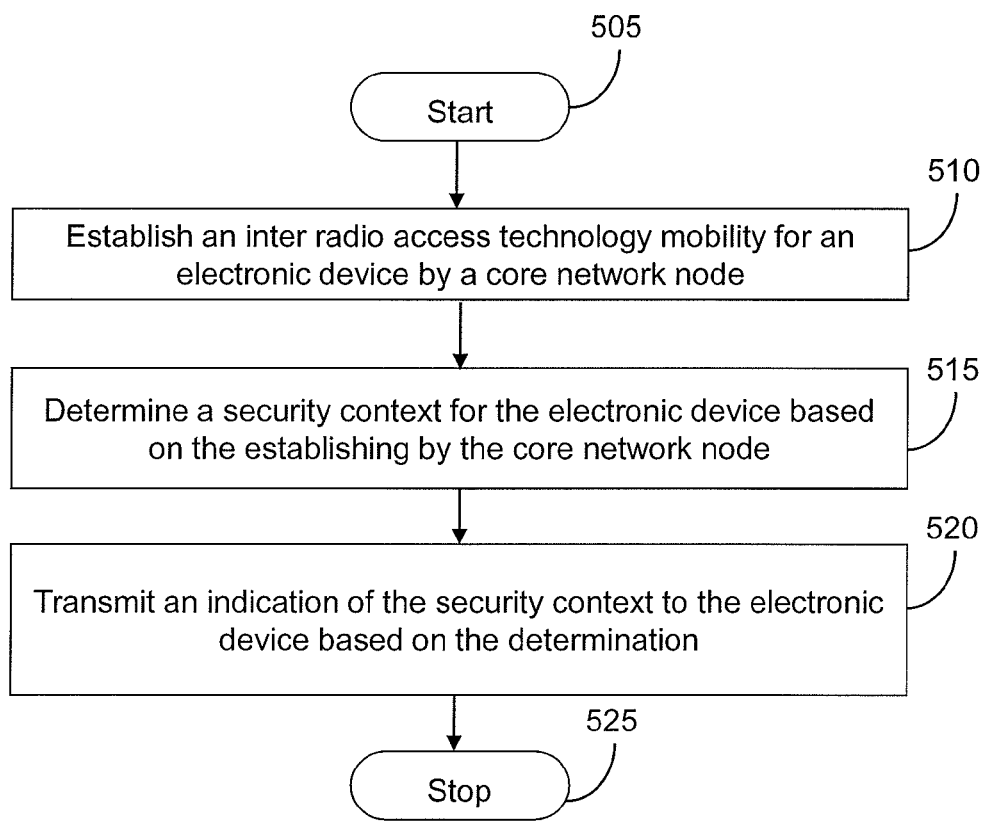
FIG. 5 is a flowchart illustrating a method for notifying a security context to an electronic device for inter radio access technology mobility according to an exemplary embodiment of the present invention.

FIG. 5 is a flowchart illustrating a method for notifying a security context to an electronic device for inter Radio Access Technology (RAT) mobility, in accordance with one embodiment. The security context can be a mapped security context or a cached security context.

The method starts at step 505.

At step 510, the inter RAT mobility is established by the core network node for the electronic device. The inter RAT mobility is established to transfer the electronic device from a source Radio Access Network (RAN) node of a source RAN to a target RAN node of a target RAN. To establish the inter RAT mobility, a handover message is transmitted from the core network node to the source RAN. The handover message is further transmitted from the source RAN node to the electronic device. The mapped security context associated with the target RAN node is acquired by the electronic device and can be stored against a key set indicator of the source RAN node. A presence of a cached security context associated with the target RAN can then be determined by the electronic device. The mapped security context is determined using one or more security parameters of a source RAT during the inter RAT mobility. For example, a Key Access Security Management Entity key (KASME) in a Long Term Evolution (LTE) network is mapped from a pair of cryptographic keys, for example, Ciphering Key (CK) and Integrity Key (IK), in a Universal Mobile Telecommunication Systems (UMTS) upon an inter RAT handover to the LTE. The cached security context can be available due to an earlier inter RAT mobility of the electronic device to the target RAN. If the cached security context is determined to be present, an indication is transmitted to the core network node by the electronic device. If the cached security context is determined as not present, then such an indication is transmitted to the core network node.

At step 515, the security context for the electronic device is determined by the core network node based on the establishing. The security context is determined by core network node based on the received indication from the electronic device. The mapped security context or the cached security context can be selected by core network node for the electronic device based on the indication received. If the presence of the cached security context is indicated by the electronic device, then cached security context is verified by the core network node else the mapped security context for the electronic device is selected by the core network node. Further, if the presence of the cached security context associated with the target RAN node is verified, then the cached security context can be selected for the electronic device.

At step 520, an indication of the security context is transmitted to the electronic device based on the determination. The indication is transmitted by the core network node to the electronic device via the target RAN. The indication can be a change in the key set indicator from a source key set indicator to a target key set indicator, if the cached security context for the electronic device is determined. The indication can be the source key set indicator, if the mapped security context for the electronic device is determined. In some embodiments, the indication is transmitted from the target RAN to the electronic device as an access stratum message. The access stratum message is indicative of the key set indicator.

The indication in the access stratum message is, for example, a single bit indication. In some embodiments, the indication is transmitted as an intra radio access technology message, indicative of the security context, to the electronic device. The intra radio access technology message is transmitted from the target RAN node to the electronic device. Also, the indication transmitted via the intra radio access technology message includes one of a valid key set indicator, an invalid key set indicator or a bit value for the key set indicator. The bit value can include either a 0 representing a true logic or a 1 representing a false logic. In some embodiments, the bit value of the key set indicator and the invalid key set indicator can indicate the mapped security context to the electronic device. In some other embodiments, the bit value of the key set indicator and the invalid key set indicator can indicate the cached security context to the electronic device. In some embodiments, the valid key set indicator can indicate the cached security context to the electronic device. In other embodiments, the valid key set indicator can indicate the cached security context to the electronic device. The security context indicated for performing the inter RAT mobility can be incorporated by the electronic device. In some embodiments, the mapped security context in the electronic device is switched to the cached security context on receiving the bit value of the key set indicator or the invalid key set indicator. Also, the mapped security context is retained in the electronic device on receiving the valid key set indicator. In other embodiments, the mapped security context is retained on receiving the bit value of the key set indicator or the invalid key set indicator and the mapped security context is changed to the cached security context on receiving the valid key set indicator.

The method stops at 525.

In the preceding specification, the present disclosure and its advantages have been described with reference to specific embodiments. However, it will be apparent to a person of ordinary skill in the art that various modifications and changes can be made, without departing from the scope of the present disclosure, as set forth in the claims below. Accordingly, the specification and figures are to be regarded as illustrative examples of the present disclosure, rather than in restrictive sense. All such possible modifications are intended to be included within the scope of the present disclosure.

While the invention has been shown and described with reference to certain exemplary embodiments thereof, it will be understood by those skilled in the art that various changes in form and details may be made without departing from the scope of the invention as defined by the appended claims below and their equivalents.

What is claimed is:

1. A method for notifying a transmission security context to an electronic device for inter radio access technology mobility, the method comprising:
   establishing, by a core network node, the inter radio access technology mobility from a source radio access network node to a target radio access network node for the electronic device;
   determining, by the core network node, a transmission security context for the electronic device based on an information received from the electronic device, after the establishing by the core network node; and
   transmitting, by the core network node, an indication indicating a change of the transmission security context to the electronic device based on the determination,
   wherein the transmission security context comprises one of a mapped transmission security context and the cached security context,
   wherein the determining of the transmission security context comprises receiving the information from the electronic device based on a presence of the cached security context,
   wherein the transmitting of the indication comprises transmitting an access stratum message indicative of the transmission security context to the electronic device,
   wherein the access stratum message is indicative of a change of a key set indicator, and
   wherein the key set indicator is one of a source key set indicator and a target key set indicator.

2. The method of claim 1, wherein the establishing of the inter radio access technology mobility comprises:
   transmitting a handover message to the source radio access network node so that the source radio access network node transmits the handover message to the electronic device.

3. The method of claim 1 further comprising:
   determining the cached transmission security context for the target radio access network node by the electronic device.

4. The method of claim 3 further comprising:
   selecting one of the mapped transmission security context and the cached transmission security context for the electronic device by the core network node based on the indication.

5. The method of claim 1, wherein the transmitting of the indication comprises:
   transmitting an intra radio access technology message indicative of the transmission security context to the electronic device.

6. The method of claim 5, wherein the indication includes one of a valid key set indicator, a bit value for key set indicator and an invalid key set indicator.

7. The method of claim 6, wherein the bit value of the key set indicator and the invalid key set indicator indicates one of a mapped transmission security context and a cached transmission security context.

8. The method of claim 6, wherein the valid key set indicator indicates one of a cached transmission security context and a mapped transmission security context.

9. A system for notifying a transmission security context to an electronic device for inter radio access technology mobility, the system comprising:
   the electronic device transferred from a source radio access network node to a target radio access network node; and
   a core network node configured to establish the inter radio access technology mobility from the source radio access network node to the target radio access network node for the electronic device, determine a transmission security context for the electronic device based on an information received from the electronic device, after the establishing by the core network node, and transmit an indication indicating a change of the transmission security context to the electronic device based on the determination through the source radio access network node,
   wherein the transmission security context comprises one of a mapped transmission security context and a cached transmission security context,
   wherein the core network node receives from the electronic device the information used to determine the transmission security context based on the presence of the cached security context,
   wherein the indication comprises an access stratum message indicative of the transmission security context to the electronic device,
   wherein the access stratum message is indicative of a change of a key set indicator, and
   wherein the key set indicator is one of a source key set indicator and a target key set indicator.

10. The system of claim 9, wherein the information indicates a presence of the cached transmission security context in the electronic device.

11. The system of claim 9, wherein the indication comprises:

an intra radio access technology message indicative of the transmission security context to the electronic device.

12. The system of claim 11, wherein the indication includes one of a valid key set indicator, a bit value for key set indicator and an invalid key set indicator.

13. The system of claim 12, wherein the key bit value of the key set indicator and the invalid key set indicator indicates one of a mapped transmission security context and a cached transmission security context.

14. The system of claim 12, wherein the valid key set indicator indicates one of a cached transmission security context and a mapped transmission security context.

* * * * *